United States Patent [19]
Hosking et al.

[11] Patent Number: 5,974,827
[45] Date of Patent: Nov. 2, 1999

[54] REFRIGERANT THERMOSTATIC VALVE

[75] Inventors: Kevin John Hosking, Wivenhoe; Jonathan David Masters; Jolyon Francis Torbitt, both of Bury St. Edmunds, all of United Kingdom

[73] Assignee: Amot Controls Limited, United Kingdom

[21] Appl. No.: 09/110,094

[22] Filed: Jul. 2, 1998

[30] Foreign Application Priority Data

Jul. 4, 1997 [GB] United Kingdom ............... 9714059

[51] Int. Cl.⁶ ..................... F25B 43/02; G05D 23/12
[52] U.S. Cl. ................. 62/468; 236/34.5; 137/625.12
[58] Field of Search ................ 62/468; 236/34, 236/34.5, 99 K, 100; 137/625.12

[56] References Cited

U.S. PATENT DOCUMENTS

| | | | |
|---|---|---|---|
| 2,810,524 | 10/1957 | Puster | 236/34 |
| 2,919,860 | 1/1960 | Wagner | 236/34.5 |
| 3,404,837 | 10/1968 | James | 236/34.5 |
| 4,562,953 | 1/1986 | Duprez et al. | 236/34.5 |
| 4,748,941 | 6/1988 | Kashiwase | 236/34.5 |
| 5,018,664 | 5/1991 | Butler | 236/34.5 |
| 5,135,163 | 8/1992 | Cho | 236/100 |

FOREIGN PATENT DOCUMENTS

| | | |
|---|---|---|
| 0063237 | 4/1981 | European Pat. Off. . |
| 1382225 | 1/1975 | United Kingdom . |

*Primary Examiner*—William E. Tapolcai
*Attorney, Agent, or Firm*—D. Peter Hochberg; William H. Holt

[57] ABSTRACT

The present invention provides a valve for use in a lubrication oil circulation system associated with the compressor of a refrigeration system, which valve has internal operating components which can be removed through a sealable access opening in the wall of the body of the valve, thus allowing the operating components of the valve to be inserted into and removed from the valve body through the access opening. This permits the valve body to be connected to the pipework of the circulation system by welded joints in place of the but joints used hitherto. The invention also provides a lubrication oil circulation system incorporating a valve mechanism of the invention.

11 Claims, 3 Drawing Sheets

REFRIGERANT THERMOSTATIC VALVE

The present invention relates to a device, notably to a thermostatic valve and to a lubricating oil cooling circuit for the compression pump of a refrigerant system incorporating such a valve.

BACKGROUND TO THE INVENTION

In a compression/expansion system for cooling a refrigerant gas, the gas is liquefied by compressing it, expanded through a nozzle or the like, during which it extracts heat from its environment, and it is then recirculated to a pump which re-compresses the gas for passage around the refrigerant gas/liquid circulation loop. Where the compression system is small, the liquid refrigerant can be used to lubricate the moving parts of the compression pump and its motor. However, where the system is large, typically handling heat extraction requirements of 10 Kwh or more, it is necessary to provide the compression pump and its motor with a separate lubrication system using a conventional lubrication oil. This can give rise to problems due to contamination of the lubrication oil by the refrigerant at those points in the refrigerant flow path where there is an interface with the lubrication oil. It is now a general health and safety requirement that all reasonable steps be taken in the design and manufacture of large scale refrigeration systems to isolate the refrigerant from the lubrication oil and purchasers will not buy systems where such steps have not been taken.

One such step has been the requirement that all joints in the refrigerant flow path be welded and not of the butting flange and gasket type of joint. Whilst welding the joints may minimize escape of refrigerant from the system at that point, it raises other problems for the manufacturer, the system installer and user and in servicing and repairing the system. Thus, it is commonplace in a refrigeration system to incorporate an oil cooler circuit in which lubrication oil from the refrigerant gas compressor is circulated through a cooler. This oil cooler circuit incorporates a by pass circuit and diverting valve mechanism so that some or all of the oil is passed through a secondary, by pass circuit and not through the cooler. By varying the proportion of oil which is directed to the by pass circuit as opposed to passing through the cooler, it is possible to control the cooling of the oil so as to maintain the optimum oil temperature. Thus, when the oil is at or near its design temperature, the majority of the lubrication oil is directed to the by pass circuit. However, when the oil is hot, for example when warm materials are placed in the cold room and must be cooled rapidly to the desired temperature thus requiring the compressor to work hard, the majority of the oil is directed through the cooler to reduce the temperature of the oil to within the desired design temperature range.

For convenience, the term refrigerant system of the above type will be used herein to denote refrigerant systems having the general features described above.

It is therefore commonplace to incorporate a control valve in the lubrication oil circuit which acts selectively to direct part or all of the flow of oil through the by pass circuit or the oil cooler. Such a valve typically comprises a thermally responsive mechanism placed in the oil flow path and actuating a multi port valve member in a three port valve body. Typically, this valve comprises a generally T shaped cast or machined stainless steel or other metal valve body having a fluid inlet at the base of the upright of the T and fluid flow outlets from the ends of the head of the T, one to the oil cooler and the other to the by pass circuit, with the valve mechanism located within the chamber formed in the valve body at the intersection of the upright and head of the T.

It will be appreciated that the valve mechanism may also act to mix hot oil from the compressor with varying amounts of oil which has passed through the cooler. In this case the valve acts as a mixer valve rather than as a diverting valve and the valve acts to regulate the flow of cooled oil from the cooler to be mixed with the warmer oil from the by pass circuit, the mixed oil flowing over the temperature responsive mechanism before flowing through the upright of the T back to the compressor pump.

However, it is necessary to have access to the operating components of the valve mechanism during construction and installation of the refrigeration system and for service and repair of the system once installed. Where all the pipe joints around the valve body are welded, as is desirable to reduce possible contamination of the lubrication oil by the refrigerant or escape of refrigerant gas from the lubricating oil through joints in the system, it would not be possible to gain access to the valve components located within the valve body. It is therefore customary to provided a flanged connection at the inlet to the upright of the T and to form a removable section in the pipework connected to that flanged connection. In this way, the removable section of the pipework can be removed to allow the installer or user to gain access to the interior of the T body of the valve and allow the operating components of the valve mechanism to be installed or removed from the valve body.

Such a design enables the internal components of the valve to be accessed, but introduces at least two flanged type of joints in the lubrication oil circuit, which is undesirable. However, no satisfactory alternative has been proposed and designers and operators in this field have accepted the presence of the flanged joints as an inevitable necessity in order to achieve access to the interior components of the valve mechanism.

It has been proposed in British Patent No. 1 382 225 to form a valve for use in mixing hot and cold water with a tubular member within which an obturator is moved axially by a temperature responsive mechanism to open and close apertures through the wall of the tubular member at each end thereof. However, an essential feature of the valve described is that is should be capable of being adjusted by a user so as to achieve a desired mixed water temperature. To this end, the temperature responsive mechanism is directly coupled to the obturator so that they are not capable of axial movement relative to one another. The coupled assembly is located upon an axially acting compression spring and the axial position of the assembly within the tubular member is adjusted by a screw mechanism acting in opposition to that spring. Such an assembly deliberately does not fix the temperature responsive mechanism axially with respect to the tubular member, but allows its axial position to vary so that the temperature of the delivered mixture of hot and cold water can be varied by a user. Such a valve is not suitable for use with the oil flow system for a compression pump for a refrigerant circuit where it is desired to maintain a substantially constant temperature in the lubricating oil passing through the compressor. Furthermore, in the valve design of BP 1 382 225, pressure fluctuations in the water passing through the valve could cause the temperature responsive mechanism to move axially against the bias of the compression spring. This will varying the position of the obturator and hence the temperature of the mixed water stream when no variation of temperature was required.

We have now devised a form of valve which reduces the above problems and avoids the need for flanged joints in the oil circuit pipework adjacent the valve. In the valve mechanism of the invention the internal components are located within a chamber within the valve body and can be inserted or removed through a sealable opening in a wall of the valve body. In this way the connections between the valve body and the remainder of the lubrication oil flow circuit pipework can be welded to minimise leakage, but access to the internal components of the valve can readily be achieved. Since the operating components of the valve are located within the valve body, the valve is compact and does not occupy excessive space, as would be the case if the operating components were mounted externally upon the valve body. Furthermore, if the operating components of the valve mechanism were mounted externally upon the valve body so that they were available for service or repair, this would require a complex and convoluted flow path for the lubrication oil through the valve mechanism and some form of sealing means for the flow of oil from within the valve body to the external operating components of the valve mechanism. We have found that by retaining the operating components within the valve body, the flow path can be simplified, thus minimising pressure drop and shear working heating of the lubrication oil.

SUMMARY OF THE INVENTION

Accordingly, the present invention provides a valve mechanism comprising:

a body member having at least an axially extending bore therethrough for permitting fluid flow through the body member, at least part of said bore forms an axial chamber within the body and has fluid flow ports at or adjacent opposed first and second ends of the said chamber, the port(s) at at least one end thereof being directed radially of the longitudinal axis of the chamber;

an access opening in the wall of the body member substantially axially in register with the longitudinal axis of the chamber and communicating with the first end of the chamber;

a demountable closure member for sealingly closing the access opening;

a demountable axially extending tubular member located within the chamber substantially coincident upon the longitudinal axis of the chamber and in radial sealing engagement with the wall of the chamber, the wall of the tubular member defining an axial bore within the tubular member;

apertures through the wall of the tubular member at or adjacent first and second ends thereof whereby the ports in the body member are in fluid communication with one another via said apertures and the axial bore in the tubular member;

an obturator member located within the axial bore of the tubular member and in sliding sealing engagement with the wall thereof for relative movement within the bore so as selectively to close the apertures of the tubular member;

a radially inwardly projecting seating member located at or adjacent the second end of the chamber a radially inwardly projecting seating member located at or adjacent the second end of the chamber or the tubular member;

a temperature responsive mechanism located at or adjacent the second end of the axial chamber by means of the engagement of a radially outward projection carried by the mechanism with the radially inward projecting seating member, the temperature responsive mechanism being located in the path of fluid flow through the chamber and operatively connected to the obturator for movement of the obturator within the axial bore of the tubular member in response to temperature changes in the fluid flowing through the chamber;

the radial dimensions of the tubular member and the temperature responsive mechanism being at least a clearance fit smaller than those of the access opening in the body member whereby the tubular member, the obturator associated therewith and the temperature responsive mechanism can be removed axially through the access opening in the body member;

the axial dimensions of the tubular member, the radially outward projection of the temperature responsive mechanism and the axial position of the radially inward projecting seating member being such that they engage one another axially in abutting relationship and are retained in fixed axial relationship to one another by the closure member when in position, but are released for axial movement when the closure member is demounted.

Preferably, the bores in the body member form a T shaped flow conduit within the body member, at least part of the portion of the conduit forming the upright of the T providing the axial chamber, and at least one other bore in the body providing the portion of the conduit forming the head of the T. It is further preferred that the radial inlets to the axial chamber serving the bores in the side arms of the head of the T at its upper, first end are axially off set from one another and the apertures at the upper, first end of the tubular member are in register with the upper of the inlets and the apertures in lower, second end of the tubular member are in register with the lower inlet and the sealing engagement between the tubular member and the wall of the axial chamber is a radial seal which minimises direct axial flow externally of the tubular member from the upper inlet to the lower inlet.

The invention also provides a compression/expansion refrigeration system having a compressor pump lubricated by a lubrication oil and having a valve for selectively directing the lubrication oil to or selectively receiving lubrication oil from a by pass circuit and/or a cooler for the lubrication oil, characterised in that the valve is a valve of the invention. Preferably the joints in the pipework of the oil flow circuit adjacent the valve are welded joints.

The invention can be applied to a straight through type of valve in which the obturator and tubular member act to throttle the flow of oil through the valve by moving the obturator to restrict the effective cross section of the flow path through one or more of the apertures in the tubular member. By restricting the flow of oil through the oil cooler, the cooling of the oil is increased. However, as indicated above, it is preferred that the valve be a three port valve having an inlet and two outlets, one to the lubrication oil cooler and the other to a by pass circuit as described above. The tubular member and obturator co-operate to divert some or all of the flow of oil through the valve to the by pass circuit in preference to the oil cooler; or to mix cooled oil from the oil cooler with the oil flowing through the by pass circuit where the valve acts as a mixer valve.

For convenience, the invention will be described hereinafter in terms of a three port valve body having an oil inlet, an hot oil outlet to the oil cooler and an oil outlet to the by pass circuit.

The valve body containing such flow conduit can be of any shape, but is preferably of a T shape with bores in the upright and head of the T which intersect where the head and upright intersect to form the T shaped flow conduit. The hot oil inlet will be at the foot of the upright of the T.

The valve body can be made from any suitable material and by any suitable method. However, a particularly preferred valve body is made by casting and subsequent machining a suitable metal, for example cast iron, steel, stainless steel or phosphor bronze.

The body can be of any suitable size, having regard to the flow rates of lubrication oil through the internal passages thereof and the pressures under which the valve is to operate.

The flow path through the valve body is by way of intersecting bores within the body which form a T shaped flow conduit within the body member. At least part of the bore in the upright of the T forms an axial chamber with the operating components of the valve located in this chamber. The axial chamber can be of any suitable shape, but will usually be of a generally cylindrical shape aligned with its longitudinal axis coincident with the longitudinal axis of the bore. In order to be able to separate the flows of oil through the bores in the two side arms of the head of the T from one another, it is preferred that the entries to those bores into the axial chamber be axially off set from one another and that these bores enter the axial chamber radially.

If desired, the chamber can be formed as an enlarged portion of the bore so as to accommodate the operating components of the valve without imposing excessive restriction on the flow of oil through the valve. Such an enlarged portion terminates in a radially inwardly directed step to form the seating member h within the chamber upon which the temperature responsive mechanism sits as described below. However, a separate annular rib or shoulder can be provided within the chamber if desired to serve this purpose.

The body member is provided with a sealed access opening in a wall thereof which lies adjacent the bore(s) forming the head of the T. This opening enables the internal components of the valve to be inserted into and removed from the axial chamber. The access opening is provided as a substantially circular opening formed in the wall in register with the longitudinal axis of the axial chamber and is provided with a screw threaded, bolt down or other type of closure disc or other removable closure member. This provides a sealing closure to the opening which can be demounted from the body member when it is desired to gain access to the axial chamber. If desired, the closure can incorporate one or more O ring or other seals to minimise leakage of lubrication oil from the closed opening.

The opening provides the means by which the internal components of the valve mechanism can be inserted into or removed from the axial chamber within the valve body. The opening is therefore sized accordingly.

When in the fully home position in the access opening, the closure member engages part of the valve mechanism to locate the tubular member and the temperature responsive mechanism within the chamber and prevent axial movement of those parts within the chamber during use as described below. The closure member may therefore be provided with radial re-enforcement and locating means to assist in this function.

The operating components of the valve mechanism comprise a tubular ported member which provides the apertures which co-operate with the moveable obturator to selectively direct the flow of lubrication oil through the valve body. Preferably, the tubular member has an open ended axial bore defined by the annular wall of the tubular member which provides, with the apertures, the flow path for oil from the inlet at the foot of the upright of the T, through the tubular member to the bores in the side arms of the head of the T and thence to the outlets at the ends of the side arms. However, where the valve is of the straight through type and acts to throttle the flow of oil through it, the tubular member can have either or both ends closed and rely upon the flow through the apertures in the annular wall to provide the necessary flow paths between the inlet(s) at one end of the valve and the outlet(s) at the other.

The apertures through the wall of the tubular member are preferably formed in register with the entries to the bores in the side arms of the head of the T which they are to serve. Thus, one or more apertures will be formed at or adjacent the upper end of the tubular member to serve the upper entry to one of the side arm bores and one or more apertures will be formed at or adjacent the lower end of the tubular member to serve the lower entry to the other side arm bore. The apertures in the tubular member can take the form of circular holes cut radially through the wall of the tubular member. However, it is particularly preferred to form the apertures as a series of circumferential cut outs from the terminal rims of the tubular member so that the minimum obstruction is offered to the flow of oil from the axial bore of the tubular member into either of the side bores in the head of the T.

The tubular member can be a push or other sealing fit within the axial chamber so that oil flows directly from the side arm bore entry to the axial bore in the tubular member. However, this may impose excessive flow restrictions and require accurate angular positioning of the tubular member within the axial chamber to ensure that the apertures in the wall of the tubular member register with the appropriate bore entry. It is therefore preferred that the axial chamber has a greater diameter than the tubular member. This will provide an annular gap between the exterior of the tubular member and the wall of the axial chamber to provide a circumferential oil flow gallery around the tubular member. This gallery communicates with a series of circumferential apertures or cut outs in the tubular member to permit flow from the bores in the side arms to the axial bore in the tubular member. In order to prevent direct axial flow between the bores in the side arms of the head of the T, it is necessary to provide some form of annular seal between the upper and lower ends of the tubular member. Such a seal will subdivide the annular gap into an upper and a lower portion, each in register with the appropriate apertures in the tubular member through which oil can flow from one of the side arms to the appropriate apertures in the wall of the tubular member. Such a seal can take the form of a radially inward annular projection on the chamber wall carrying a rubber O ring seal or the like on the free end thereof which sealing engages the exterior of the tubular member. Alternatively, the exterior of the tubular member can carry a radially outward annular projection and seal to engage the wall of the chamber. Where the tubular member carries such an annular projection, the overall radial dimensions of the tubular member including such a projection must be less than those of the opening in the body wall through which the working parts of the valve are to be inserted or removed.

The radial projections carrying the seals also serve to locate and radially support the tubular member.

If desired, the chamber wall may be provided with other internal axial walls or partitions, for example to provide the axial off set to the entries to the bores in the side arms of the head of the T. Such other walls may also act to support the tubular member radially.

The tubular member can take the form of a cast iron, steel, stainless steel, phosphor bronze or other metal, fritted ceramic hollow tubular member with two series of circumferential ports separated axially from one another.

The tubular member extends axially between the access opening in the body member at the first, upper end of the axial chamber to an annular seat at the second, lower end of the axial chamber and is secured in position axially by the closure member. The annular seat is preferably a radial flange carried by the thermally responsive mechanism which itself engages the annular rib or shoulder formed in the wall of the axial chamber so that the assembly of the tubular member and the temperature responsive mechanism is clamped in position against axial movement within the axial chamber when the closure member is in its fully home position. However, if desired, the temperature responsive mechanism may be located wholly within the tubular member which is provided with an internal flange, rib or series of inwardly directed projection to retain the mechanism against axial movement. If desired, the terminal rims of the tubular member can incorporate resilient members which act as seals between the contacting faces of the closure, the tubular member and the flange of the temperature responsive mechanism and also accommodate any variations in axial dimensions about the design values for the valve components.

The obturator member can take a number of forms and serves to close or expose the apertures in the tubular member. Preferably, the obturator is an open ended sleeve member slideably journalled for axial movement within the tubular member so as to fully expose the apertures at one end of the tubular member but fully obstruct those at the other end of the tubular member at either extreme of its travel. However, it is within the scope of the present invention for the obturator to be a sold plug provided with the necessary radial and axial bores therein to achieve the same effect and allow axial flow through the plug. It is also within the scope of the invention for the obturator to rotate within the tubular member to bring ports in the obturator wall into and out of register with the apertures in the tubular member. For convenience, the invention will be described hereinafter in terms of the use of an annular sleeve member which is moved axially within the tubular member by the temperature responsive mechanism.

The obturator may be made from cast iron, steel, stainless steel, phosphor bronze or other metal or a fritted ceramic.

Fluid flows axially along the central bore of the obturator and escapes radially either through the apertures in the lower end of the tubular member and/or through the apertures in the upper end of the tubular member, depending upon the axial position of the obturator sleeve within the tubular member. In a particularly preferred embodiment, the obturator member does not have radial ports in the cylindrical wall thereof, but radial flow paths are created at each end of the member when it is moved axially. Thus, the axial length of the obturator member is preferably less than the axial distance between the apertures in the wall of the tubular member so that annular flow paths are formed at each end of the obturator by which oil can flow from the axial bore of the obturator, through the exposed apertures in the tubular member and into the bores in the side arms of the T. When the obturator member is at the lower extreme of its travel, its lower lip seats in sealing engagement with either the annular support ring of the temperature responsive mechanism or an annular seat in axial chamber or within the tubular member; and at the upper end of its travel its upper lip seats in sealing engagement with an annular seat on the opposed face of the closure member or within the tubular member. As the obturator member moves axially away from either extreme of its travel, it lifts off the relevant seat and an annular flow path is formed between the seat and the end of the obturator member, thus allowing oil to flow radially from the axial bore of the obturator member to the upper and/or lower apertures in the tubular member.

The obturator moves in sliding, sealing engagement within the tubular member. If desired, the tubular member and the obturator member can carry O rings or other circumferential seals at the axial interface between the two members to minimise cross flow between the upper and lower apertures of the tubular member along the annular interface between the obturator and the tubular member.

The obturator member is caused to move relative to the tubular member by the temperature responsive mechanism. This can be of any suitable form and acts to cause relative axial or rotational movement between the obturator and the tubular member. Thus, the temperature responsive member can move a spirally wound drive shaft axially within a slot carried by the obturator. The obturator is restrained against axial movement, for example by means of a circumferential inwardly directed flange in the bore of the tubular member at the top of the obturator member. As a result, axial movement of the drive shaft causes rotation of the obturator so as to bring ports in the wall thereof into and out of circumferential register with the appropriate apertures in the wall of the tubular member.

However, it is preferred that the temperature responsive mechanism moves the obturator axially in sliding engagement within the tubular member as described above. Such movement can be achieved by an expanding metal bellows, gas filled strut or other temperature responsive means. A particularly preferred temperature means is a wax filled bulb, optionally containing thermally conductive particles such as copper, which expands or contracts with changes in temperature and causes the obturator to move. By locating the wax filled bulb in the flow of lubrication oil, the bulb is exposed to the fluctuations in temperature of the oil, which in turn reflect the cooling of the oil which is required to maintain it within its desired operating temperature. Such wax mechanisms are know as wax stats and are available commercially and may be used in their commercially available forms. Preferably, the temperature responsive mechanism has a push rod to provide the mechanical linkage between it and the obturator member.

The temperature responsive mechanism has a continuous or discontinuous radially outward projecting annular flange by which it can be mounted in the axial chamber and secured against axial movement within the chamber during use. For example, an internal flange or projection(s) within the tubular member, which itself is retained against axial movement within the axial chamber by the axial clamping action of the closure member as described above, can bear downwardly upon the radial flange which fits within the bore of the tubular member. However, it is particularly preferred that the radial flange carried by the temperature responsive mechanism extend radially beyond the tubular member so that it is trapped between the seating step or flange of the axial chamber and the lower end of the tubular member as the closure member is secured within the access opening. The radial flange carried by the temperature responsive mechanism can also provide the seat against which the bottom lip of the tubular obturator member seats at the bottom extreme of its travel as described above.

The operating components of the valve mechanism preferably are mounted upon one another and in the axial chamber so that they are symmetrical about the longitudinal axis of the chamber so as to provide a symmetric flow path into and through the operating components to the valve. In a particularly preferred form the components are of a generally circular cross section.

By mounting the operative components removably within the chamber in the valve body, a manufacturer can readily assemble the valve mechanism using different temperature responsive mechanisms to operate the valve. The valve can thus be made using standard components and the temperature range over which it operates readily varied by selecting an appropriate temperature responsive mechanism. However, since the operating components can be readily removed, the valve body can be welded in position in the oil flow system without the risk that the high temperatures during welding could cause damage to the temperature responsive mechanism. Furthermore, since the obturator is the main moving part and the temperature responsive mechanism is secured against axial movement, the initial closed position of the valve mechanism can be accurately set and will not vary during use and the position of the obturator will not tend to vary with changes in the pressure of fluid flowing through the valve.

In use, lubrication oil is caused to flow through the compressor pump used to compress the refrigeration gas from the refrigerant system. The compressor pump is provided with a circuit through which lubrication oil is circulated through either a cooler and/or a by pass circuit by a secondary pump via a valve of the invention. As the temperature of the oil changes due to fluctuations in the load on the compressor pump, the temperature responsive mechanism of the valve alters the position of the obturator. This will expose some or all of the apertures in the tubular member directing oil flow through the appropriate side arm of the T circuit to the cooler or the by pass circuit. It will be appreciated that the flow may be through both the cooler and the by pass circuit to achieve intermediate cooling effects on the oil flow and that the obturator adopts positions within the tubular member intermediate the extremes of its travel at which both the upper and lower apertures in the wall of the tubular member are at least partially exposed. Furthermore, the flow of oil through the valve of the invention is not subjected to radical and repeated changes in direction> the oil is thus not subjected to excessive shear working, which may itself cause heating of the oil, and there is no major drop in pressure across the valve.

In the event that the valve needs servicing or repair, the operating components can be readily removed from the valve body through the access opening without the need to dismantle adjacent pipework or to break welded joints. By locating the operating components within the valve body, the construction and installation of the valve is simplified.

The invention finds especial application in controlling the flow of lubrication oil in refrigeration systems where the heat extraction requirement is in excess of about 10 Kwh, since these are the systems where problems in the use of welded pipework are encountered. However, it will be appreciated that the invention can find use in smaller refrigeration systems where the refrigerant compressor pump has a lubrication oil circulation circuit.

DESCRIPTION OF THE DRAWINGS

A preferred embodiment of the invention will now be described by way of illustration with respect to the accompanying drawings in which.

DESCRIPTION OF THE PREFERRED EMBODIMENT

Figure 3:
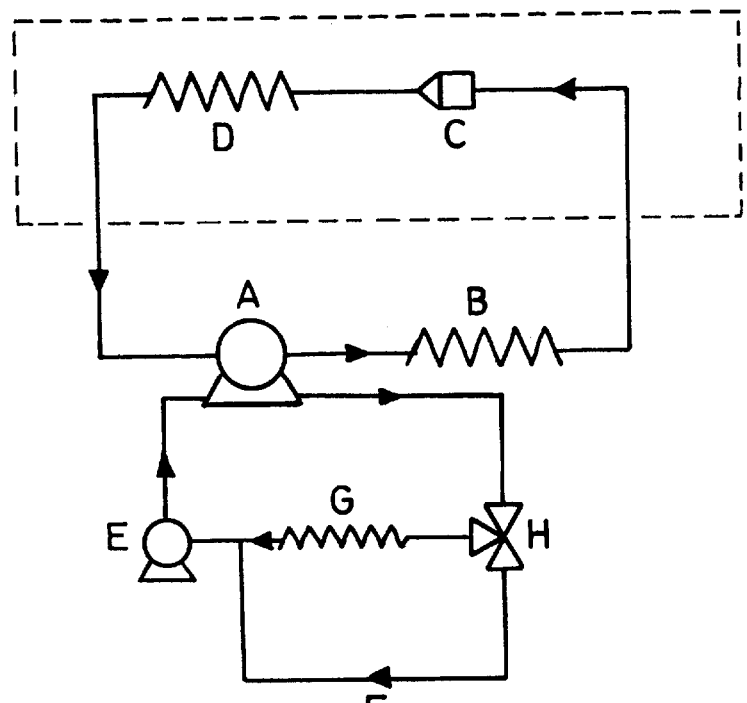
FIG. 3 is a diagrammatic flow diagram of a refrigeration system incorporating a valve of FIG. 1 acting in the flow diversion mode.
Figure 4:
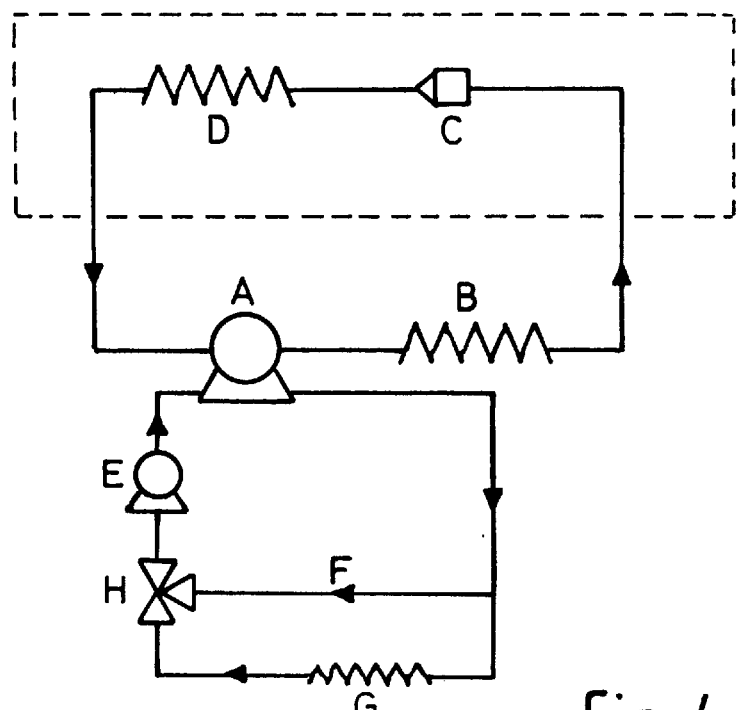
FIG. 4 is a diagrammatic flow diagram of a system incorporating a valve operating in the flow mixing mode.

A refrigeration circuit comprises a refrigerant gas compression pump A, a condenser cooling coil B, an expansion nozzle C, a cooling coil or plate D which extracts heat from a cold room or other load (shown as a dotted enclosure in FIGS. 3 and 4). The refrigerant gas returns to the input of the compression pump A. Pump A has a lubrication oil circuit comprising a secondary pump E which circulates oil through a by pass circuit F or through a cooler G under the control of a diversion valve H. The various components of the refrigeration and oil circulation systems are of conventional design and construction, except for valve H controlling the flow of the lubrication oil.

Valve H comprises a valve body 1 made from cast iron, stainless steel or the like cast by the lost wax process and finished to provide the necessary mating and sliding surfaces by conventional machining techniques. The body is in the general form of a hollow T shape with an oil inlet 2, an outlet 3 to the by pass circuit F (shown in FIG. 3) and an outlet 4 to the oil cooler G (shown in FIG. 3).

Figure 2:
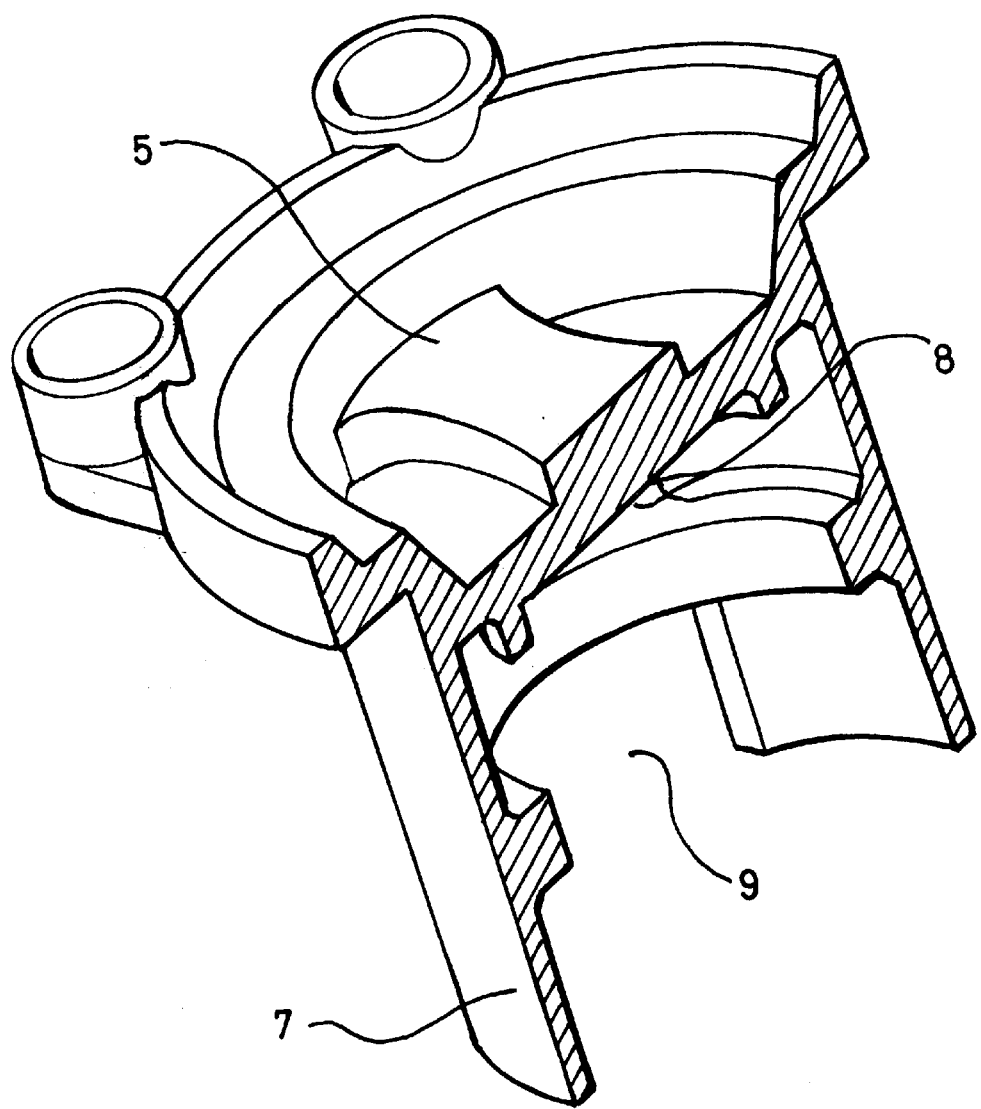
FIG. 2 is a diagrammatic elevational view of a combined closure member and tubular member for use in the valve of FIG. 1.

The upper wall of the head of the T of valve H is cut with a circular access opening, within which is mounted a circular cap 5 which provides a removable sealing closure to the opening. The cap 5 can be secured to the valve body 1 by a screw thread, by bolts or any other releasable means. Within body 1 is an axial chamber 6 extending from the intersections of the inlet and outlet bores at the head of the T towards the foot of the upright of the T. The chamber 6 has its longitudinal axis substantially coincident with the upright of the T. Mounted within this chamber is a tubular member 7. As shown in FIG. 2, the cap 5 and the tubular member 7 can be formed as a single component or can be formed as two separate components. Preferably, member 7 extends axially downwardly for the full depth of chamber 6 to clamp an annular flange carrying the temperature responsive means as described below. The cylindrical wall of member 7 is cut with one or more apertures 8 at the axially upper portion of member 7 and one or more apertures 9 at the axially lower portion of member 7.

Within the circular axial bore of member 7 is slideably engaged a tubular obturator 10 which moves axially within member 7 under the influence of a wax stat temperature responsive mechanism 11. The central bore in obturator 10 provides an axial fluid flow path through the obturator 10. The obturator 10 does not extend for the full axial length of the bore of member 7 so that, when the obturator is at its axially lowered position, it provides an annular flow path over the upper lip of member 10 and radially outward through the upper apertures 8 in member 7. When the obturator 10 is moved axially upward by the temperature responsive mechanism 11, an annular flow path is formed under the lower lip of member 10 and radially outward through the lower apertures 9 in member 7.

The wax stat temperature responsive mechanism 11 is mounted by radial support arms 12 upon an annular flange 13 which is trapped by the foot of member 7 upon an annular recess 14 in the body 1 at the base of chamber 6. Wax stat 11 acts upon obturator 10 by means of a push rod 15.

The interior of chamber 6 is sub-divided into an upper portion and a lower portion by the axial walls 16 and 17 which each carry radially inwardly directed terminations which radially support and locate the member 7, which is preferably thickened at this point to carry sliding seals which engage the side face of obturator 10.

Figure 1:
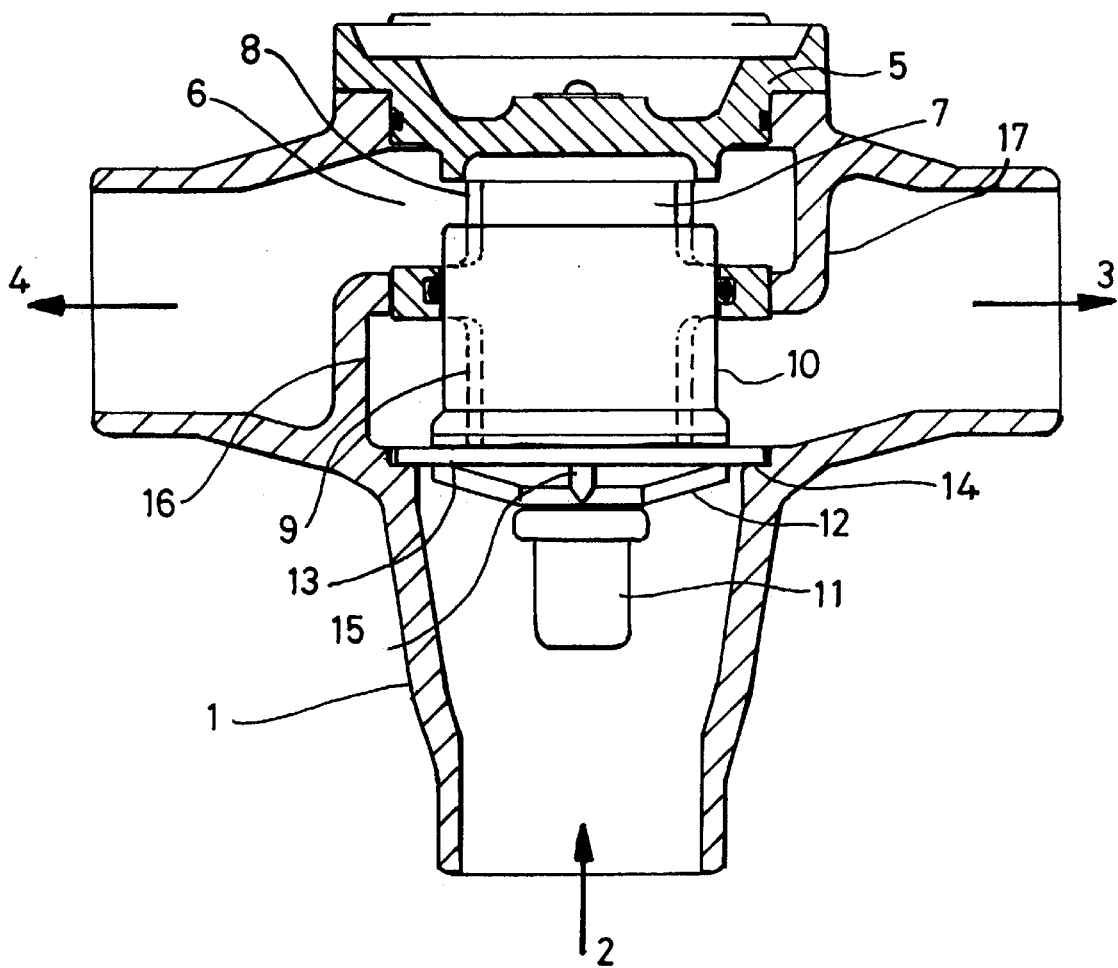
FIG. 1 is a vertical sectional view through the valve.

When in the position shown in FIG. 1, the obturator 10 is in the lowered position exposing the upper apertures 8 in member 7 and the base of obturator member 10 seats upon the annular flange 13 to prevent flow of oil radially outward from the base of obturator 10. Oil thus flows in at inlet 2, through the axial bore in obturator 10, over the open top of obturator 10 and radially out through apertures 8 in member 7 into outlet 4. This oil returns via the by pass circuit F to the pump A driven by secondary oil circulation pump E.

When the temperature in the oil flowing over the wax stat 11 rises, due to increased heat extraction requirements in the cold room or other load, the wax in the wax stat expands causing obturator 10 to be moved axially upwards in member 7. This causes the annular fluid flow path between the top lip of the obturator 10 and the underside of cap 5 to be progressively closed as the obturator rises until the upper end of obturator 10 seats against the underside of cap 5. As obturator 10 rises, its base rises off flange 13 and opens a radial flow path from the axial bore in obturator 10 to ports 9 and hence to outlet 3. This allows oil to flow through the oil cooler G to cause increased cooling of the oil. This cooled oil is mixed with the other oil circulating via the by pass circuit F to cool the overall temperature of the lubrication oil to within the required temperature range.

The operating components of the valve can be readily removed by removing cap 5 and withdrawing member 7, the obturator 10 and the wax stat 11 axially through the resultant aperture. In order to assist smooth flow of oil through the valve, it is preferred that all the operating components be of a substantially circular cross-section and that they be mounted upon the longitudinal axis of inlet 2.

In the system shown in FIG. 4, the valve H operates in the mixing mode to regulate the relative proportions of cooled oil flowing from cooler G and the warmer oil flowing via the by pass circuit F. In this case the flow of oil through the valve is the reverse of that required in FIG. 3. Warmer oil from the by pass circuit F enters the valve via outlet 4 and the cooled oil from cooler G via outlet 3. The flows combine to flow out via inlet 2 and act on the temperature sensitive wax stat 11 to cause obturator 10 to vary the relative proportions of the cooled and warmer oils to achieve the required outlet oil temperature.

We have found that the design of valve shown in FIGS. 1 and 2 provides a particularly simple construction with a minimum of moving parts which can readily be manufactured and is particularly easy to assemble and dismantle and which minimises changes of flow direction and thus pressure drop across the valve.

We claim:

1. A valve mechanism comprising:
    a body member having at least an axially extending bore therethrough for permitting fluid flow through the body member,
    at least part of said bore forms an axial chamber within the body and has fluid flow ports at or adjacent opposed first and second ends of the said chamber, the port(s) at at least one end thereof being directed radially of the longitudinal axis of the chamber:
    an access opening in the wall of the body member substantially axially in register with the longitudinal axis of the chamber and communicating with the first end of the chamber;
    a demountable closure member for sealingly closing the access opening;
    a demountable axially extending tubular member located within the chamber substantially coincident upon the longitudinal axis of the chamber and in radial sealing engagement with the wall of the chamber, the wall of the tubular member defining an axial bore within the tubular member;
    apertures through the wall of the tubular member at or adjacent first and second ends thereof whereby the ports in the body member are in fluid communication with one another via said apertures and the axial bore in the tubular member;
    an obturator member located within the axial bore of the tubular member and in sliding sealing engagement with the wall thereof for relative movement within the bore so as selectively to close the apertures of the tubular member;
    a radially inwardly projecting seating member located at or adjacent the second end of the chamber or of the tubular member;
    a temperature responsive mechanism located at or adjacent the second end of the axial chamber by means of the engagement of a radially outward projection carried by the mechanism with the radially inward projecting seating member, the temperature responsive mechanism being located in the path of fluid flow through the chamber and operatively connected to the obturator for movement of the obturator within the axial bore of the tubular member in response to temperature changes in the fluid flowing through the chamber;
    the radial dimensions of the tubular member and the temperature responsive mechanism being at least a clearance fit smaller than those of the access opening in the body member whereby the tubular member, the obturator associated therewith and the temperature responsive mechanism can be removed axially through the access opening in the body member;
    the axial dimensions of the tubular member, the radially outward projection of the temperature responsive mechanism and the axial position of the radially inward projecting seating member being such that they engage one another axially in abutting relationship and are retained in fixed axial relationship to one another by the closure member when in position, but are released for axial movement when the closure member is demounted.

2. A valve as claimed in claim 1, wherein there are intersecting bores in the body member which form a T shaped flow conduit within the body member, at least part of the portion of the conduit forming the upright of the T providing the axial chamber, and at least one other bore in the body providing the portion of the conduit forming the head of the T.

3. A valve as claimed in claim 2, wherein there are two radial inlets to the axial chamber serving the bores in the side arms of the head of the T at its upper, first end, which radial inlets are axially off set from one another; and the apertures at the upper, first end of the tubular member are in register with the upper of the inlets; and the apertures in lower, second end of the tubular member are in register with the lower inlet; and the sealing engagement between the tubular member and the wall of the axial chamber is a radial seal which minimises direct axial flow externally of the tubular member from the upper inlet to the lower inlet.

4. A valve as claimed in claim 1, wherein the obturator member is a sleeve member which is adapted to move axially within the tubular member.

5. A valve as claimed in claim 1, wherein the temperature responsive mechanism has a radially outwardly projecting flange which is trapped between the lower end of the tubular member and the annular inwardly projecting seating member of the axial chamber.

6. A valve as claimed in claim 1, wherein the tubular member and the closure member are formed integrally with one another.

7. A valve mechanism comprising:

a body member having bores therein forming a generally T shaped fluid conduit within the body member, one bore forming the upright of the T conduit and at least one other bore forming the transverse head of the T conduit, the body member having fluid flow ports in the walls thereof at the free ends of the upright of the T conduit and of the arms of the head of the T conduit, the ports being in fluid flow communication with one another via the T shaped conduit;

an access opening in that wall of the body member adjacent that portion of the conduit forming the head of the T, the opening being axially substantially in register with the longitudinal axis of and communicating with that portion of the conduit forming the upright of the T;

closure means sealingly closing the opening and being demountable from the body member to permit access to that portion of the conduit forming the upright of the T;

at least part of that portion of the conduit forming the upright of the T providing an internal axial chamber within the body member extending from an upper end at or adjacent said closure member to a lower end at or adjacent a radially inwardly extending seating projection located within that portion of the conduit forming the upright of the T;

a tubular member located within the axial chamber substantially coincident with the longitudinal axis of the chamber and extending axially between upper and lower ends abutting respectively the closure member and the inwardly projecting seating member of the axial chamber, the wall of the tubular member defining the axial bore of the tubular member and having at least two circumferentially extending apertures therethrough to provide radial fluid flow communication between the fluid ports in the body, at least one of said apertures being located at or adjacent the upper end of the tubular member and another at the lower end of the tubular member;

sealing means between the exterior of the tubular member and the interior wall of the axial chamber and dividing said axial chamber into an upper portion and a lower portion in fluid flow isolation from one another except via the circumferential apertures and the axial bore in the tubular member;

a tubular obturator member adapted to move axially relative to and within the axial bore in the tubular member and to co-operate with the apertures thereof to vary the size of the flow path through the apertures; and a temperature responsive mechanism located within the axial chamber and adapted to move the obturator member axially within the axial bore of the tubular member by means of an axially extending piston rod, the temperature responsive mechanism having a flange extending radially outwardly therefrom at or adjacent the lower end thereof, which flange is trapped between the annular seating member of the axial chamber and the lower end of the tubular member when the closure member is fully mounted within the access opening so as to prevent axial movement of the temperature responsive mechanism during use.

8. A valve mechanism as claimed in claim 7, wherein the obturator member is configured so that it is adapted to move axially between:

a lower position at which the obturator prevents flow of fluid to the lower end apertures in the tubular member, there being an annular radial flow path between the upper end of the obturator member and the closure member or the adjacent valve body so as to permit flow of fluid from the axial bore of the obturator member to the apertures in the upper end of the tubular member; and an upper position at which the obturator prevents flow of fluid to the upper end apertures in the tubular member, and an annular radial flow path is formed between the lower end of the obturator member and the temperature responsive mechanism so as to permit flow fluid to the lower apertures of the tubular member.

9. A compression/expansion refrigeration system having a compressor pump lubricated by a lubrication oil and having a valve for selectively directing the lubrication oil to or selectively receiving lubrication oil from a by pass circuit and/or a cooler for the lubrication oil, characterized in that the valve is a valve as claimed in claim 1.

10. A system as claimed in claim 9, wherein the joints in the pipework of the oil flow circuit adjacent the valve are welded joints.

11. A system as claimed in claim 9, wherein the valve acts to mix a flow of cooled oil from an oil cooler with warmer oil from the by pass circuit, the combined oil flow flowing over the temperature responsive mechanism to cause the obturator to move relative to the tubular member so as to adjust the proportions of the cooled and warmer oil.

\* \* \* \* \*